(12) United States Patent
Hasegawa

(10) Patent No.: US 8,083,032 B2
(45) Date of Patent: Dec. 27, 2011

(54) POWER SOURCE DEVICE

(76) Inventor: Koichi Hasegawa, Kurobe (JP)

( * ) Notice: Subject to any disclaimer, the term of this patent is extended or adjusted under 35 U.S.C. 154(b) by 889 days.

(21) Appl. No.: 11/918,332

(22) PCT Filed: Sep. 27, 2005

(86) PCT No.: PCT/JP2005/017688
§ 371 (c)(1),
(2), (4) Date: Oct. 11, 2007

(87) PCT Pub. No.: WO2007/036977
PCT Pub. Date: Apr. 5, 2007

(65) Prior Publication Data
US 2009/0071756 A1    Mar. 19, 2009

(51) Int. Cl.
*H02K 7/18* (2006.01)
(52) U.S. Cl. .............. 185/39; 74/625; 290/1 E; 322/9
(58) Field of Classification Search .......... 74/625; 185/39; 290/1 E; 322/9
See application file for complete search history.

(56) References Cited

U.S. PATENT DOCUMENTS 3,573,479 A * 4/1971 Rieth ........................ 290/1 E
3,732,949 A * 5/1973 Williams ................... 185/40 R
3,970,939 A * 7/1976 Willis ....................... 340/307
5,590,741 A * 1/1997 Storms ...................... 185/10
5,880,532 A * 3/1999 Stopher .................... 290/1 E

FOREIGN PATENT DOCUMENTS

| JP | 56-056144 | 5/1981 |
| JP | 03-032178 | 3/1991 |
| JP | 10-248208 | 9/1998 |
| JP | 2005-039987 | 2/2005 |

* cited by examiner

*Primary Examiner* — William C Joyce
(74) *Attorney, Agent, or Firm* — Flynn, Thiel, Boutell & Tanis, P.C.

(57) ABSTRACT

There is provided a power source device capable of obtaining power not only when springs or the like return but also when a handle for winding up the springs or the like are operated. The power source device comprises a main shaft connected to both the handle and a main power generation device, an auxiliary shaft connected to an auxiliary power generation device arranged side by side in parallel with the main shaft, the main spring and the auxiliary spring requiring less load to wind up than the main spring being installed between the main shaft and the auxiliary shaft via drums such that accumulation and release of elastic force of the springs are alternated on both shafts, wherein when the main shaft is normally rotated by the handle, elastic force accumulated in the auxiliary spring is applied in the direction of rotation of the main shaft as releasing force.

4 Claims, 3 Drawing Sheets

POWER SOURCE DEVICE

TECHNICAL FIELD

The invention relates to a power source device capable of obtaining power by force accumulated, as a mechanical energy, in a spring or the like by human power.

BACKGROUND TECHNOLOGY

In a system where power has been conventionally generated manually, such as by rotating a handle or the like, a speed for rotating the handle is differentiated depending on a person or frequently varied so that a stable voltage is hardly obtained. It is necessary to mount a battery onto such a system so as to obtain a constant voltage, however when the battery is consumed, it need be replaced with another battery, and the used battery is wasted, resulting in fear of environmental pollution. Accordingly, employment of such a system raises a problem. As a result, there is proposed another system wherein a mechanical energy is accumulated in a spring and force of the mechanical energy is utilized. This is exemplified by a talking guide unit as disclosed in JP 2003-424032 by an applicant same as the applicant of the present invention.

FIG. 5 shows a conventional system provided with a power generation device 52 for utilizing force accumulated as a mechanical energy generated by rotating a handle 50, and a recording reproduction system 54 which is operated by the power generated by the power generation device 52. In this system, a winding-down drum 58 on which a spring 56 is wound up and a winding-up drum 60 coaxially provided onto a shaft of the handle 50 are provided so as to accumulate the mechanical energy wherein the winding down drum 58 is arranged in parallel with the winding-up drum 60, and also a power generator 66 is coaxially provided onto the shaft of the handle 50 via a clutch 64.

PROBLEMS TO BE SOLVED BY THE INVENTION

However, according to the conventional power source device, power is generated only when the spring is wound down, and hence power is not utilized when the spring is wound up. Accordingly, it was impossible to construct a system capable of providing operation conditions of the handle, other information utilizing power.

SUMMARY OF THE INVENTION

It is therefore an object of the invention to provide a power source device capable of obtaining power not only when a spring or the like returns but also when a handle for winding up the spring or the like is operated.

MEANS FOR SOLVING THE PROBLEMS

To achieve the above object, the present invention is to provide the power source device comprising a main shaft connected to both a handle and a main power generation device, an auxiliary shaft connected to an auxiliary power generation device and arranged side by side in parallel with the main shaft, a main spring and an auxiliary spring requiring less load to wind up than the main spring being installed between the main shaft and the auxiliary shaft via drums such that accumulation and release of elastic force of the springs are alternated on both shafts, wherein when the main shaft is normally rotated by the handle, elastic force accumulated in the auxiliary spring is applied in the direction of rotation of the main shaft as releasing force.

With the configuration of the power source device, in an early stage where the handle is not operated, elastic force, i.e. mechanical energy is accumulated in the auxiliary spring, so that when the main shaft is rotated in the normal direction (hereinafter referred to as normally rotated) by the handle, the main spring is wound up on the main winding-up drum. At this point in time, since force generated when the auxiliary spring returns is added, the winding load of the main spring is reduced, and at the same time, the auxiliary power generation device is operated by the rotation of the auxiliary shaft so that an auxiliary power which is required e.g. for indicating the rpm of the handle and so forth is generated. Further, since the mechanical energy is accumulated in the main spring upon completion of the normal rotation of the handle, if the main shaft is made free, the main shaft is rotated in the inverse direction (hereinafter referred to as inversely rotated) as the release of the mechanical energy, thereby driving the main power generation device to generate a main power as the power source device, and at the same time, the auxiliary spring is wound up on an auxiliary winding-down drum against elastic force of the auxiliary spring so that the mechanical energy as an initial stage is conserved.

EFFECT OF THE INVENTION

As described above, according to the invention, a separately provided small spring or the like is wound by the force generated when the wound spring returns, and a normal power generation (main power source) is implemented by force other than the forgoing force. Further, there is provided a mechanism wherein the small spring or the like returns when the spring or the like is wound by rotating the handle, thereby generating power which is utilized as an auxiliary power. As a result, power can be obtained not only when the spring returns but when the handle is rotated, so that for example, the necessary rpm of the handle is guided by lighting of an LED or a sound by use of the auxiliary power source, thereby contributing to the stable utilization of the main power. Still further, there is an advantageous effect that power generation time is increased by the addition of power generation time of the auxiliary power source.

BEST MODE FOR CARRYING OUT THE INVENTION

Embodiments of the invention are now described with reference to the accompanying drawings.

FIG. 1 and FIG. 2 show an embodiment of the invention, wherein a power source device comprises a casing 1 fitted to bracing struts 2, 2, a base plate 3 serving as a front face for housing therein main components, an opposite plate 5 provided on and spaced from the base plate 3 via support members 4, 4, . . . , a pair of right and left auxiliary opposite plates 6, 7 fitted to the opposite plate 5 via support members 8, 8, . . . , and a handle 9 protruded from the base plate 3 at the rightward position.

As components housed in the housing 1, there are provided, between the base plate 3 and the opposite plate 5, a main shaft 11 coaxially provided onto the handle 9 and an auxiliary shaft 13 arranged side by side in parallel with the main shaft 11 via springs, and there are also provided a main power generation device 15 on the opposite plate 6 which is driven by the main shaft 11 and an auxiliary power generation device 17 on the other auxiliary opposite plate 7 which is driven by the auxiliary shaft 13. Further, there are installed a main spring (which is a constant torque spring, but hereinafter referred to as a main spring) 19 and an auxiliary spring (which is a constant torque spring, but hereinafter referred to as an auxiliary spring) 21 between the base plate 3 and opposite plate 5.

A handle clutch 22 is intervened between the handle 9 and the main spring 19 so as to connect between handle 9 and the main shaft 11 only when the handle 9 winds up the main spring 19, and hence the handle 9 protrudes from a clutch housing box. A main winding-up drum 23 for winding up the main spring 19 and an auxiliary winding-down drum 25 for winding up the auxiliary spring 21 are coaxially provided onto the main shaft 11, wherein the main winding-up drum 23 is fixedly engaged with the main shaft 11 while the auxiliary winding-down drum 25 is engaged with the main shaft 11 via a connection clutch 27 for unidirectional rotation. Regarding the connection clutch 27 for unidirectional rotation, it is connected to the main shaft 11 when the main shaft 11 is inversely rotated, but if this is viewed from the auxiliary spring 21, elastic force of the auxiliary spring 21 causes the main shaft 11 to be normally rotated.

A main winding-down drum 29 corresponding to the main winding-up drum 23 and an auxiliary winding-up drum 31 corresponding to the auxiliary winding-down drum 25 are respectively coaxially provided onto the auxiliary shaft 13, wherein since both the main winding-down drum 29 and auxiliary winding-up drum 31 are integrally molded so that they are fixedly engaged with the auxiliary shaft 13. Since the main spring 19 is wound around the main winding-up drum 23 and main winding-down drum 29, when the handle 9 is normally rotated, the main spring 19 is wound up on the main winding-up drum 23 with the deformation of elastic force (against elastic force). At this point in time, the auxiliary winding-up drum 31 is inversely rotated together with the auxiliary shaft 13, so that the auxiliary spring 21 is wound up on the auxiliary winding-down drum 25 with its elastic force.

FIG. 2(a) shows a state where the main spring 19 is wound up on the main winding-up drum 23 against its elastic force by the operation of the handle 9. Accordingly, a mechanical energy is accumulated in the main spring 19, and it is consumed by the auxiliary spring 21. Further, FIG. 2(a) shows a state where the inverse rotation of the main shaft 11 is inhibited by the stoppage of the handle 9 so that the mechanical energy is accumulated in the main spring 19. FIG. 2(b) shows a state where the handle 9 is released.

When the handle 9 is released as shown in FIG. 2(b), the main shaft 11 is inversely rotated by force generated when the main spring 19 is wound down so that the main power generation device 15 operates. At the same time, the auxiliary shaft 13 is normally rotated so that the auxiliary spring 21 is wound up on the auxiliary winding-up drum 31 against its elastic force. Meanwhile, at this point in time, the connection clutch 27 for unidirectional rotation transmits the inverse rotation of the main shaft 11 to the auxiliary winding-down drum 25 so that the auxiliary winding-down drum 25 winds down the auxiliary spring 21 and the auxiliary winding-up drum 31 winds up the auxiliary spring 21 thereon. FIG. 2(c) shows a state of completion of winding down of the main spring 19. At this point in time, the main spring 19 consumes the mechanical energy and a part thereof is accumulated in the auxiliary spring 21 as the mechanical energy. FIG. 2(c) shows a state of pre-operation of the power source device by a user.

In the state shown in FIG. 2(c) where the user merely stands without operating the power source device, the mechanical energy is accumulated in the auxiliary spring 21, and hence at the first stage of operation, when the user rotates the handle 9 as shown in FIG. 2(d) to wind up the main spring 19 from the main winding-down drum 29 on the main winding-up drum 23 against its elastic force, the auxiliary spring 21 releases the mechanical energy, thereby causing the auxiliary winding-down drum 25 to be normally rotated, and also causing the auxiliary shaft 13 to be inversely rotated so as to apply force to the main shaft 11 in the direction of normal rotation. That is, the normal rotation of the main shaft 11 operates to assist the normal rotation of the handle 9. Further, at this point in time, the auxiliary power generation device 17 operates due to the inverse rotation of the auxiliary shaft 13. The auxiliary power source guides the necessary rpm of the handle by lighting of an LED or a sound, thereby contributing to the stable utilization of the main power.

The time when completing the normal rotation of the handle 9 is a state as shown in FIG. 2(a), and when the handle clutch 22 is operated to be rendered in "open" state, a mechanical energy is accumulated again in the auxiliary spring 21 owing to the return of the main spring 19 as shown in FIG. 2(b), and at the same time, the main power generation device 15 is driven to generate the main power.

FIG. 3 and FIG. 4 show a second embodiment of the invention, wherein a main winding-up drum 23 is fixedly coaxially provided onto a main shaft 11 connected to a handle 9 via a handle clutch 22, in the same manner as the foregoing embodiment, and an auxiliary winding-up drum 33 is arranged in parallel with the main shaft 11 while coaxially provided onto the main shaft 11 via a connection clutch 35 for unidirectional rotation for winding up an auxiliary spring 21 against its elastic force. Meanwhile, a main winding-down drum 29 is freely coaxially provided onto an auxiliary shaft 13 and an auxiliary winding-down drum 37 corresponding to the auxiliary winding-up drum 33 is fixedly coaxially provided onto the auxiliary shaft 13. Further, the connection clutch 35 for unidirectional rotation transmits force generated by the inverse rotation of the main shaft 11 to the auxiliary winding-up drum 33. Still further, the main spring 19 and auxiliary spring 21 are installed between the main shaft 11 and auxiliary shaft 13 while they cross multiplication. Other components are the same as those of the foregoing embodiment.

FIG. 4(a) to 4(d) are views corresponding to FIG. 2(a) to FIG. 2(d), wherein FIG. 4(a) shows a state where a mechanical energy is accumulated in the main spring 19 since the main spring 19 is wound up on the main winding-up drum 23 with its elastic force. At this point in time, the auxiliary spring 21 is wound up on the auxiliary winding-down drum 37 so that it is in an initial value where it is not elastically deformed.

However, when the handle 9 is released to allow the main shaft 11 free (FIG. 4(b)), the main spring 19 is wound down onto the main winding-down drum 29 with its elastic force to inversely rotate the main shaft 11 with its force so that a main power generation device 15 is driven. At the same time, since the auxiliary winding-up drum 33 winds up thereon the auxiliary spring 21 against its elastic force, upon completion of the winding up of the auxiliary spring 21 (upon completion of the winding down of the main spring 19) (FIG. 4(c)), it is rendered in a state where the mechanical energy is accumulated in the auxiliary spring 21, which state is held by the operation of the connection clutch 35 for unidirectional rotation so that the auxiliary spring 21 urges the main shaft 11 in the direction of normal rotation.

In this state (FIG. 4(c)), since the main spring 19 is in an initial state where it is not elastically deformed, when it is wound up on the main winding-up drum 23 against its elastic force by the operation of the handle 9 (FIG. 4(d)), the operation of the handle 9 is reduced by the agency of urging force of the auxiliary spring 21. Meanwhile, at this point in time, the auxiliary spring 21 inversely rotates the auxiliary shaft 13 with its elastic force to drive an auxiliary power generation device 17.

Although the foregoing embodiments explained the case where the main and auxiliary springs are formed of a constant torque spring, either the main or auxiliary spring or both the main and auxiliary springs may be formed of a normal spring.

EXPLANATION OF REFERENCE NUMERALS

Figure 1:
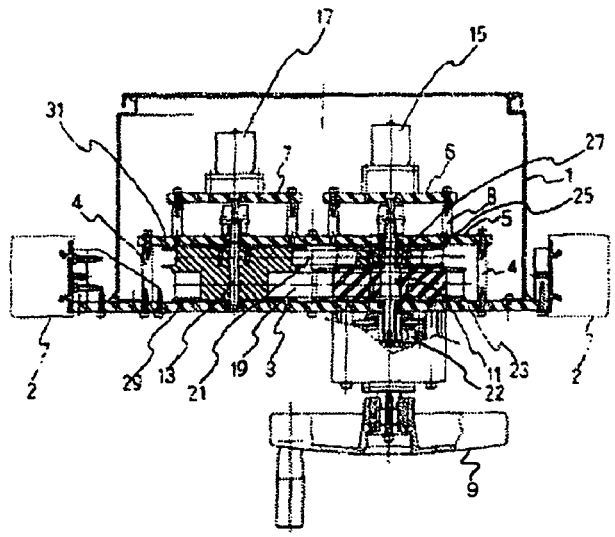
FIG. 1 is a sectional view of a power source device according to an embodiment of the invention as seen from the top thereof.
Figure 2A:
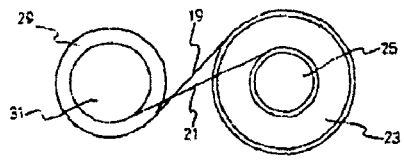
FIGS. 2(*a*), (*b*) (c) and (d) are views showing the operations of the power source device of the same embodiment in alphabetical order.
Figure 2B:
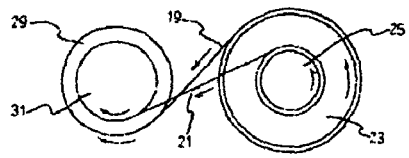
Figure 2C:
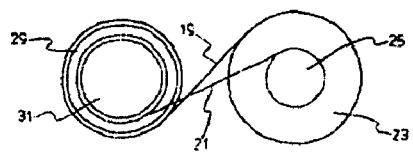
Figure 2D:
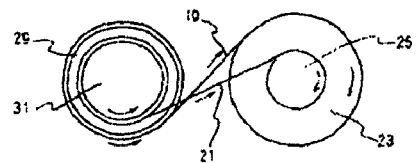
Figure 3:
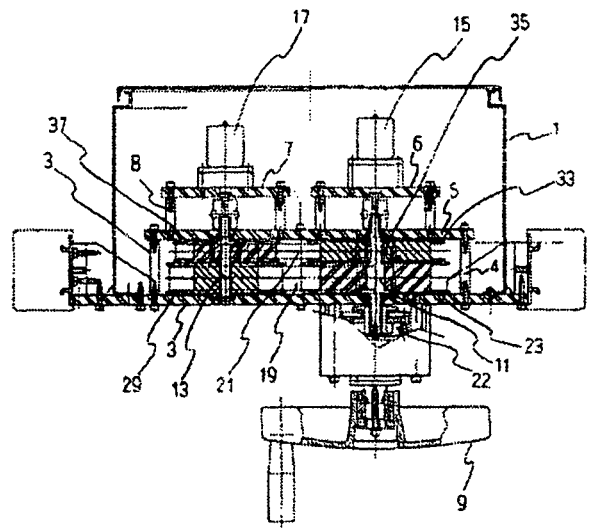
FIG. 3 is a sectional view of a power source device according to another embodiment of the invention as seen from the top thereof.
Figure 4A:
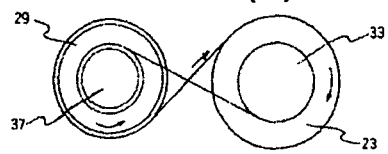
FIGS. 4(*a*), (*b*) (c) and (d) are views showing the operations of the power source device of the same another embodiment in alphabetical order.
Figure 4B:
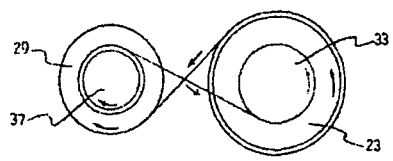
Figure 4C:
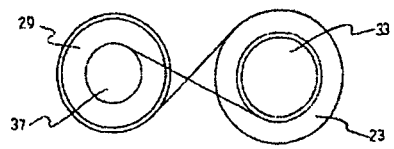
Figure 4D:
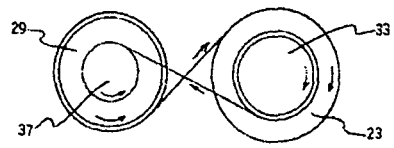
Figure 5:
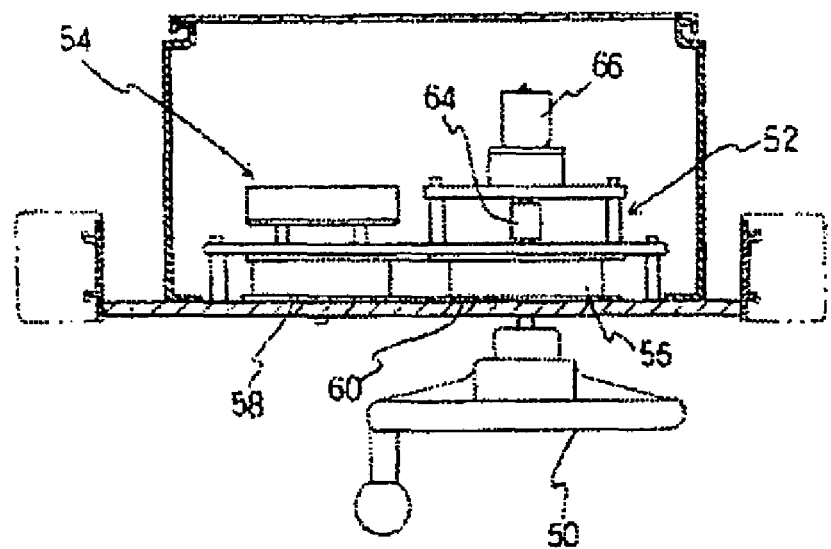
FIG. 5 is a sectional view showing a conventional power source device.

9 handle
11 main shaft
13 auxiliary shaft
15 main power generation device
17 auxiliary power generation device
19 main spring
21 auxiliary spring
23 main winding-up drum
27 connection clutch for unidirectional rotation
33 auxiliary winding-up drum
35 connection clutch for unidirectional rotation
37 auxiliary winding-down drum

What is claimed is:

1. A power source device comprising a main shaft connected to both a handle and a main power generation device, an auxiliary shaft connected to an auxiliary power generation device and arranged side by side in parallel with the main shaft, a main spring and an auxiliary spring requiring less load to wind up than the main spring being installed between the main shaft and the auxiliary shaft via drums such that accumulation and release of elastic force of the springs is alternated on both shafts, wherein when the main shaft is normally rotated by the handle, elastic force accumulated in the auxiliary spring is applied in the direction of normal rotation of the main shaft as releasing force.

2. The power source device according to claim 1, wherein the main spring and auxiliary spring are installed such that a main winding-up drum for winding up the main spring by the rotation of the handle against its elastic force is fixedly coaxially provided onto the main shaft, and an auxiliary winding-down drum is coaxially provided onto the main shaft, via a connection clutch for unidirectional rotation for winding up the auxiliary spring as the return thereof in order to add elastic force accumulated in the auxiliary spring in the direction of rotation of the main winding-up drum, while a main winding-down drum onto which the main spring is wound up as the return thereof from the main winding-up drum against its elastic force and an auxiliary winding-up drum onto which the auxiliary spring is wound up from the auxiliary winding-down drum against its elastic force are respectively fixedly coaxially provided onto the auxiliary shaft.

3. The power source device according to claim 1, wherein the main spring and auxiliary spring are installed such that a main winding-up drum for winding up the main spring by the rotation of the handle against its elastic force is fixedly coaxially provided onto the main shaft, and an auxiliary winding-up drum is coaxially provided onto the main shaft, via a connection clutch for unidirectional rotation for winding up the auxiliary spring as the return thereof in order to add elastic force accumulated in the auxiliary spring in the direction of rotation of the main winding-up drum, while a main winding-down drum onto which the main spring is wound up as the return thereof from the main winding-up drum against its elastic force is rotatably coaxially provided onto the auxiliary shaft, and an auxiliary winding-down drum onto which the auxiliary spring is wound up from the auxiliary winding-up drum against its elastic force is fixedly coaxially provided onto the auxiliary shaft.

4. The power source device according to claim 1, wherein the main spring and auxiliary spring are formed of a constant torque spring.

* * * * *